United States Patent [19]

Daniels

[11] Patent Number: 5,094,025

[45] Date of Patent: Mar. 10, 1992

[54] ANIMAL SCENT HEATER

[75] Inventor: Jerry C. Daniels, Dallas, Tex.

[73] Assignee: Hunting Adventures, Inc., Seagoville, Tex.

[21] Appl. No.: 513,924

[22] Filed: Apr. 24, 1990

[51] Int. Cl.$^5$ .............................................. F41C 27/00
[52] U.S. Cl. ........................................... 43/1; 43/129; 239/136
[58] Field of Search ............... 219/271; 261/DIG. 65; 43/1, 129; 239/44, 6, 51.5, 136, 139, 145

[56] References Cited

U.S. PATENT DOCUMENTS

| | | |
|---|---|---|
| 1,021,270 | 3/1912 | Scott . |
| 2,690,500 | 9/1954 | Winberg . |
| 3,046,192 | 7/1962 | Bilyeu . |
| 3,421,841 | 1/1969 | Wittwer . |
| 3,482,929 | 12/1969 | Gentil ................................. 239/44 |
| 3,548,532 | 12/1970 | Landwer . |
| 3,550,853 | 12/1970 | Gray ................................... 239/44 |
| 3,623,260 | 11/1971 | Konle . |
| 3,656,254 | 4/1972 | Schmedes et al. . |
| 3,778,924 | 12/1973 | Okui ................................... 43/129 |
| 3,986,670 | 10/1976 | Syveson . |
| 4,163,038 | 7/1979 | Nishimura . |
| 4,214,146 | 7/1980 | Schimanski . |
| 4,286,754 | 9/1981 | Jones ................................... 239/6 |
| 4,323,193 | 4/1982 | Compton et al. ................ 239/44 |
| 4,324,763 | 4/1982 | Jarman . |
| 4,326,119 | 4/1982 | Swiatosz . |
| 4,425,302 | 1/1984 | Pons Pons . |
| 4,571,485 | 2/1986 | Spector . |
| 4,588,874 | 5/1986 | Napierski . |
| 4,662,353 | 5/1987 | Mifune . |
| 4,663,315 | 5/1987 | Hasegawa et al. ............... 239/44 |
| 4,667,430 | 5/1987 | Ziese . |
| 4,675,504 | 6/1987 | Suhajda . |
| 4,682,715 | 7/1987 | Reeves . |
| 4,687,904 | 8/1987 | Melanson et al. . |
| 4,703,155 | 10/1987 | Suhajda . |
| 4,771,563 | 9/1988 | Easley . |
| 4,773,178 | 9/1988 | Marek . |
| 4,777,345 | 10/1988 | Manchester . |

FOREIGN PATENT DOCUMENTS 947693 3/1947 France ............................. 239/51.5

*Primary Examiner*—Richard K. Seidel
*Assistant Examiner*—James Miner
*Attorney, Agent, or Firm*—Richards, Medlock & Andrews

[57] ABSTRACT

The invention relates to the electric heating of animal scent using a wick to draw scent from a container and a resistive heating element.

7 Claims, 3 Drawing Sheets

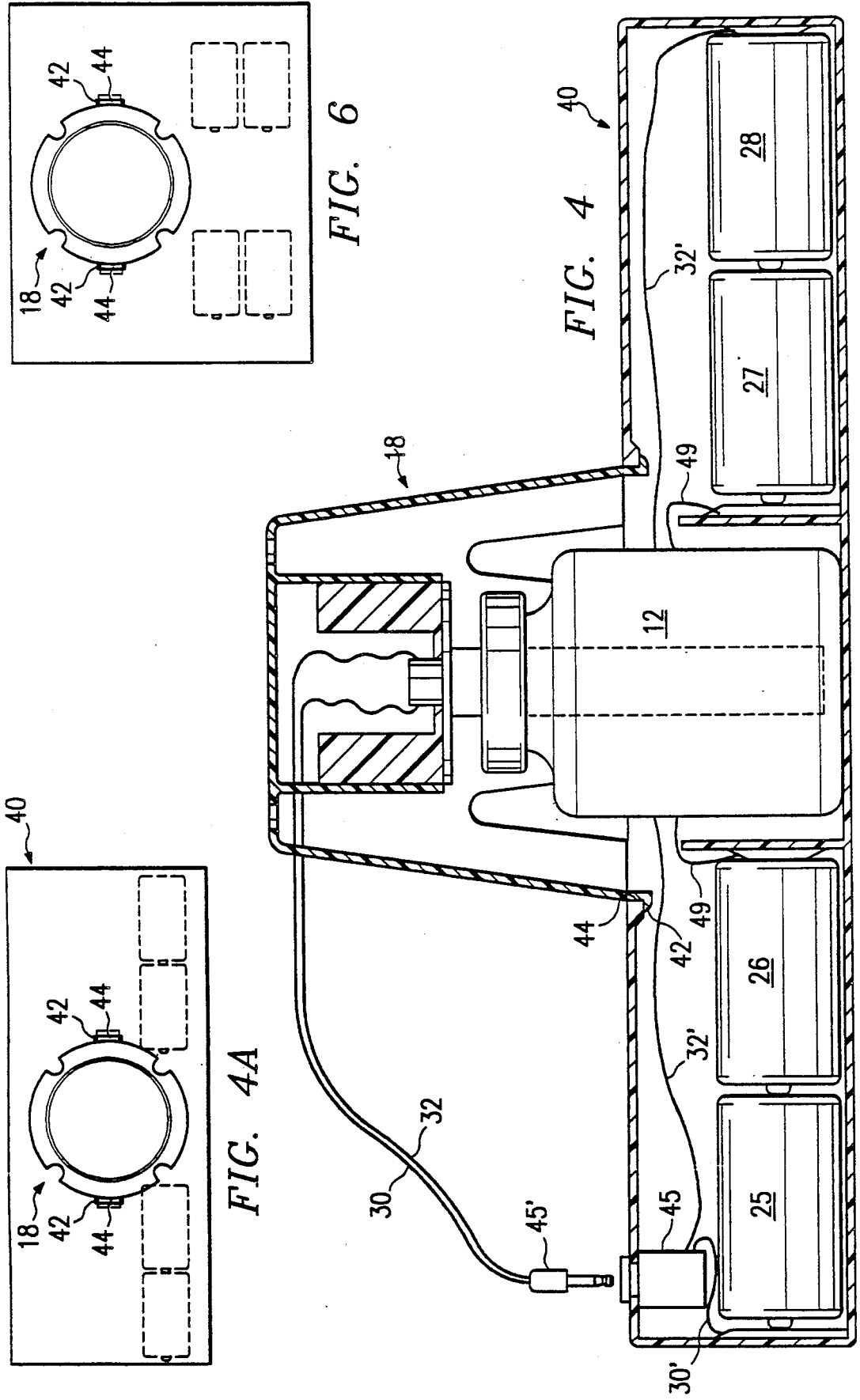

ANIMAL SCENT HEATER

BACKGROUND OF THE INVENTION

This invention relates to the field of animal scent heating and more particular to heating deer scent.

It has been known for some time that animal scents, such as the urine of a doe, could be used in hunting to either mask human odor or to attract the animal.

It is also known that when the weather is cold, the scents (usually in a liquid form) do not carry well, because the liquid has cooled to the ambient air temperature. Therefore, hunters try to keep the scent warm. This serves two purposes: first, it prevents the scent from freezing, and second, the warm fluid volatilizes to a greater extent than cold fluid, and therefore carries further in the atmosphere.

Early heating methods used combustible materials and were unsatisfactory because the odor created from combustion would mingle with the animal scent and had an unnatural odor. This combustion problem is avoided by electrically heating the scent.

Another problem in the prior art is that previous devices required that the animal scent be transferred from one container to another. This could result in spillage and, in the case of skunk scent, results in contaminating the hunter as if he had been sprayed. Therefore, there is a need for a device which can electrically heat animal scent without the need of transferring scent from one container to another.

A further problem in the past has been that the amount of liquid volatizing has been fairly small due to the fact that the liquid air surface area is small when a bottle of scent is heated, resulting in a need to provide for a large liquid-to-air contact area while still providing electrical heating.

SUMMARY OF THE INVENTION

According to the invention, there is provided a device for attraction of animals with animal scent, the animal scent being held by a container.

According to an embodiment of the invention, there is provided a wick in fluid contact with the animal scent, a heating element in proximity with the wick, and a first housing in which the heating element is contained. The housing includes at least one vent which is positioned such that animal scent vapor escapes through the vent when the device is in use.

Also according to an embodiment of the invention, the heating element is heated without monitoring the temperature of the scent, and there is no feedback control of the temperature of the heating element.

According to another embodiment of the invention, the heating element is a resistive element in electrical connection with a substantially direct current source, such as 1.5 volt batteries connected in series.

According to a further embodiment of the invention, the heating element has a maximum temperature of about 160 degrees Fahrenheit.

According to yet another embodiment of the invention, the container resides in a second housing, and the second housing has a top which contains a hole through which the container is inserted at least partially into the second housing. The first housing has a first means for connecting to the first housing, the second housing has a second means for connecting to the second housing, and the first and the second means for connecting mate with each other.

According to another embodiment of the invention the heating element is a resistive element in electrical connection with a substantially direct current source, and the substantially direct current source is mounted within the second housing.

According to a further embodiment of the invention, the wick includes multiple elements, for example, a first wicking element physically contacting a second wicking element, wherein the second wicking element touches the heating element, and the first wicking element is in fluid contact with the animal scent and with the second heating element.

According to yet a further embodiment, the second wicking element is less dense than the first wicking element.

BRIEF DESCRIPTION OF THE DRAWINGS

FIG. 4 shows an embodiment for housing and heating animal scent.

FIG. 4A shows an embodiment for attaching two housings together.

FIG. 6 shows an alternative embodiment in which the batteries are not all in line.

DESCRIPTION OF EMBODIMENTS OF THE INVENTION

Figure 1:
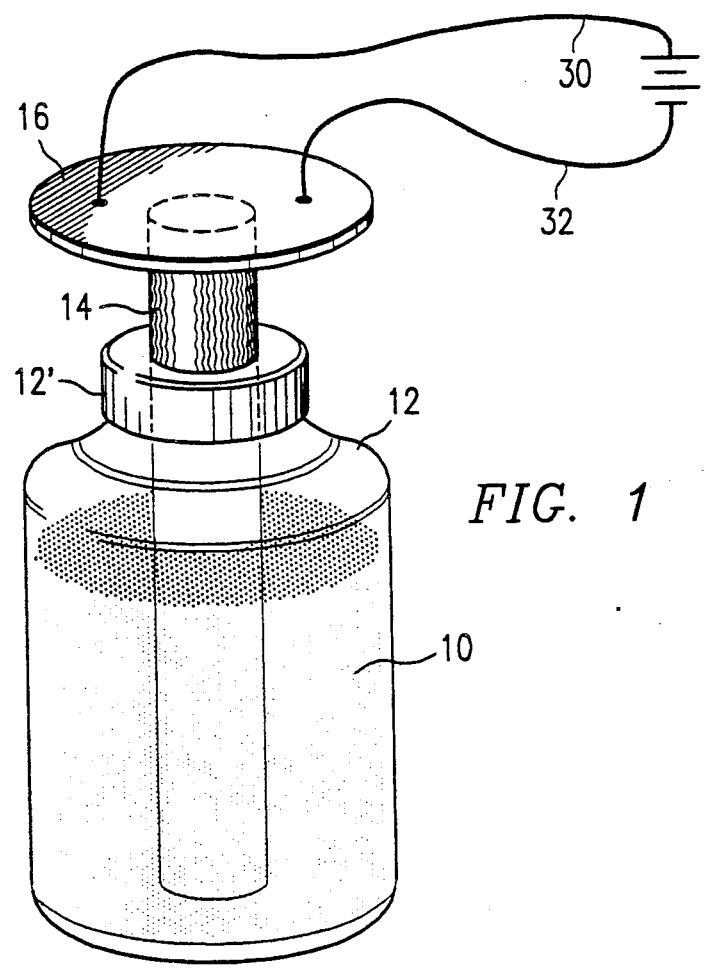
FIG. 1 is a plan drawing of an embodiment of the invention.

Referring to FIG. 1, a device for attraction of animals with animal scent 10 is shown. The animal scent is held by a container 12 with a cap 12' through which a wick 14 is inserted to be in fluid contact with the animal scent 10. In the embodiment shown, a heating element 16 is in proximity with wick 14, and wick 14 is made of felt. In one embodiment, heating element 16 touches wick 14, and in an alternative embodiment, heating element 16 need only be close to wick 14 to provide heat. Therefore, as used herein, "in proximity with" includes both (1) touching and (2) a close physical relationship in which heat is transferred, but the wick 14 and heating element 16 do not touch.

Figure 2:
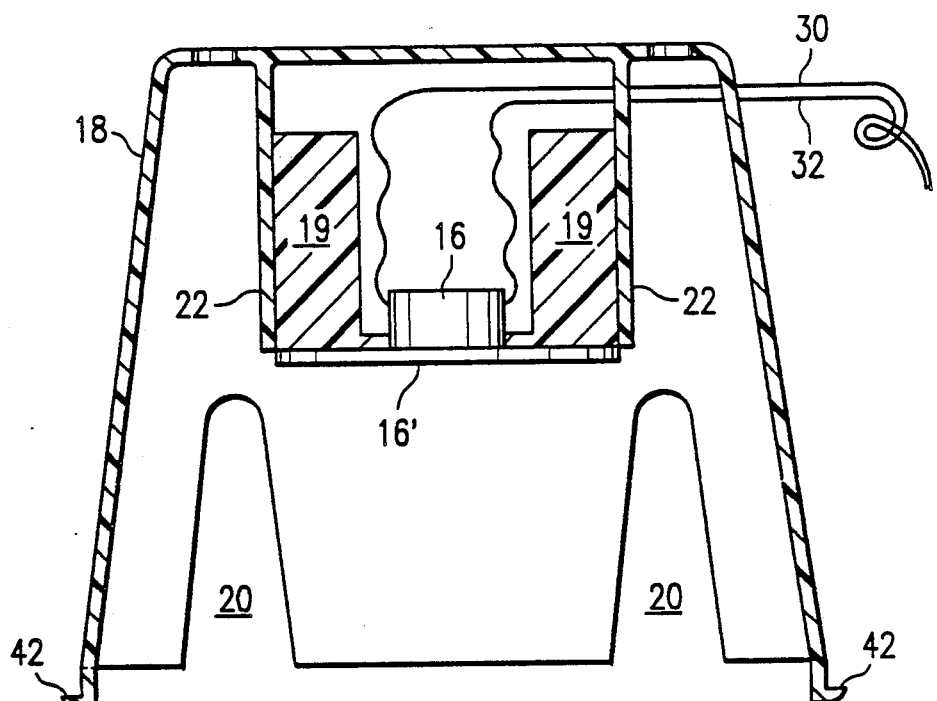
FIG. 2 shows a means for mounting the heating element to the first housing of the embodiment shown in FIG. 1.

As seen in FIG. 2, there is shown a first housing 18 in which heating element 16 is contained. In this embodiment, heating element 16 is frictionally mounted in first housing 18 by a friction member 19. Heating element 16 is mounted to aluminum disk 16' in this embodiment which serves as an integral heating element with heating element 16. Tabs 22 holds friction member 19 in housing 18. First housing 18 includes at least one vent 20 which is positioned such that when the device is in use, animal scent vapor escapes through vent 20 into the atmosphere. In the embodiment shown, heating element 16 is a fireproof resistor rated at 20 ohms at 5 watts with a 10% degree of accuracy mounted to aluminum disk 16'.

Figure 3:
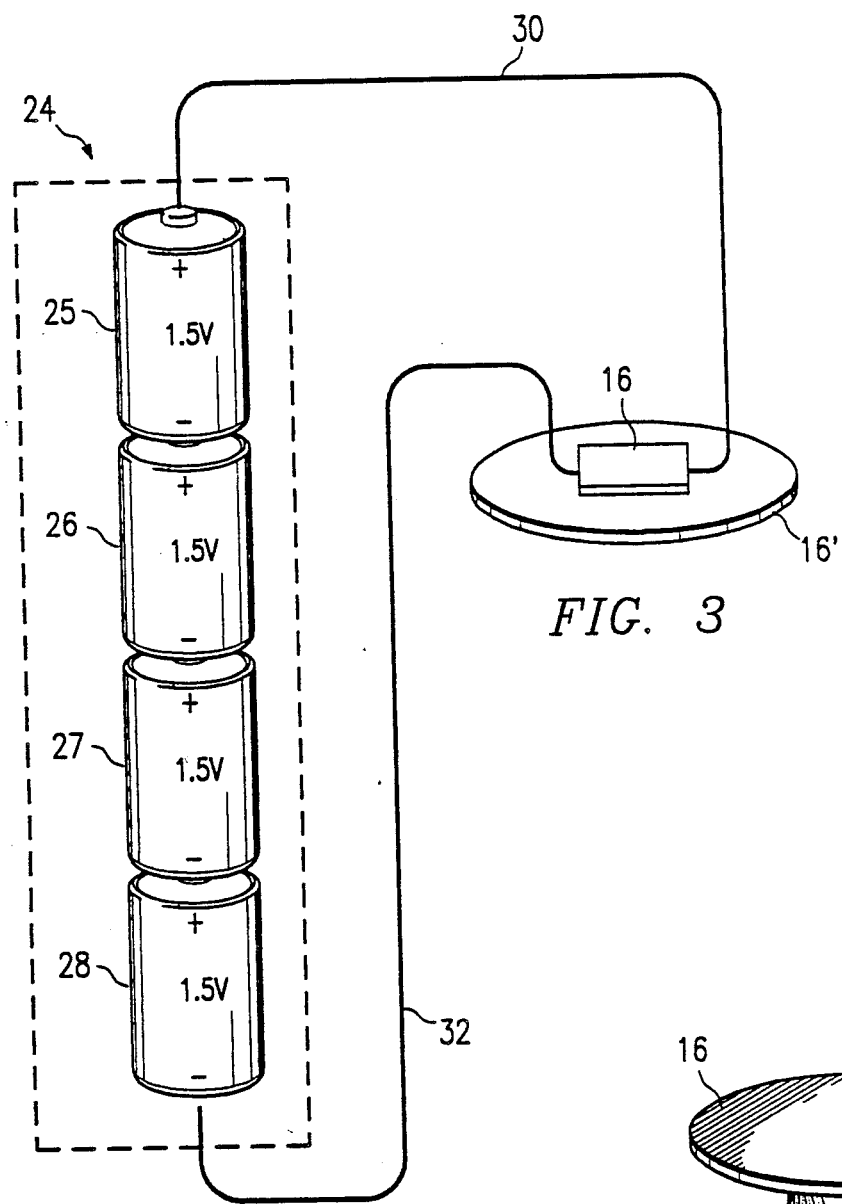
FIG. 3 shows an embodiment of the invention using a resistive heating element, connected in series with batteries.

As seen in FIG. 3, heating element 16 is heated without monitoring the temperature of the scent and without feedback control of the temperature of the heating element 16, as heating element 16 is in electrical connection, via wires 30 and 32, with a substantially direct current source 24, such as the four 1.5 volt batteries 25, 26, 27, and 28, shown connected in series.

In this embodiment, the need for temperature monitoring or feedback control is eliminated by designing heating element 16 to have a temperature of no more than approximately 160 degrees Fahrenheit for a given resistance and current flow through heating element 16. It will be noted that as batteries 25-28 lose power, their voltage drops, resulting in a corresponding reduction in current flow through heating element 16 and, therefore, less heat. Accordingly, there is no need to monitor the temperature of the scent to prevent it from being heated too much, and as long as the batteries do not deplete too much while the device is in operation, the scent will still be heated sufficiently to effectively volatilize the scent into vapor. It has been found that a circuit as shown in FIG. 3 will heat liquid doe urine sufficiently for approximately 12 hours in actual field conditions of about 70 degrees air temperature.

Referring now to FIG. 4, an embodiment is shown in which the container 12 resides in a second housing 40. Second housing 40 has a top which contains a hole through which the container 12 is held at least partially into second housing 40. First housing 18 is connected to second housing 40 by a first means for connecting housings 42 which mates with a second means for connecting 44 (best see in FIG. 4A). FIGS. 4 and 4A show means 42 as tabs and means 44 as slots; however in an alternative embodiment, means 42 is threads which mate with means 44, also constructed as threads.

In still a further embodiment, means 42 and 44 are the respective hook and carpet elements of velcro fasteners. Other embodiments of means 42 and 44 will occur to those of skill in the art which do not depart from the spirit of the invention.

In embodiments such as those shown in FIGS. 4A and 6, batteries 25-28 are mounted in second housing 40, and because of their weight, they add stability to the device. Batteries 25-28 are connected in series via wires 30', 32', and 49. However, in alternative embodiments, batteries 25-28 are arranged vertically within second housing 40, or even in first housing 18. In the embodiment shown in FIG. 4, female connector 45 is mounted in second housing 40 and connected across the series arrangement of batteries 25-28, as shown. Batteries 25-28 are connector through female connector 45 by male connector 45', which is connected across heating element 16 by wires 30-32, as shown.

In the field, the embodiment shown in FIG. 4 is carried fully assembled to the place where it is to be used, but with connectors 45 and 45' disconnected to preserve battery power. Thus, even with gloves, the hunter can easily turn on the device without cumbersome manipulation of various elements or the need to pour scent.

Figure 5:
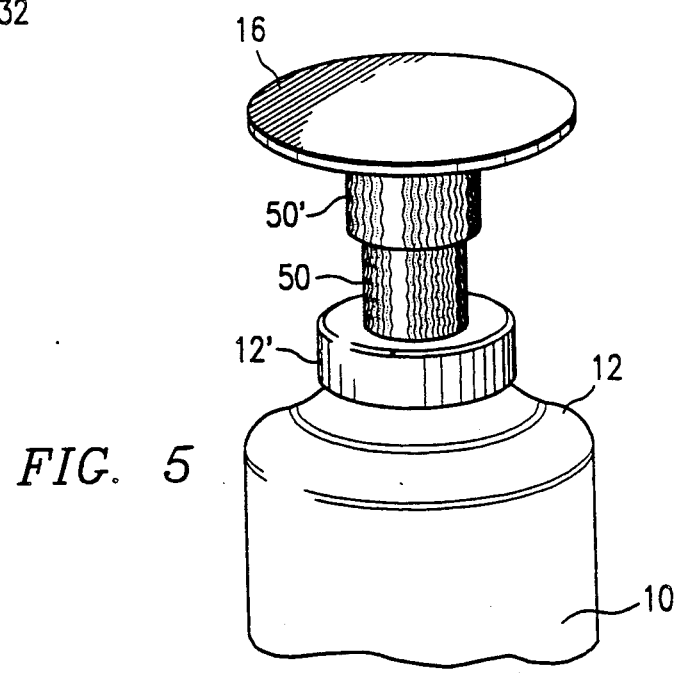
FIG. 5 shows an alternative embodiment of wicks used to draw fluid from a container.

In alternative embodiments, wick 14 comprises differing wicking materials. For example, in the embodiment shown in FIG. 5, wick 14 is made from a first wicking material 50 and second wicking material 50'. First wicking material 50 is in fluid contact with both animal scent 10 and second wicking material 50'.

As used herein, the term "fluid contact" refers to the proximity of a wicking material with another wicking material or a body of fluid, wherein liquid is transferred from the fluid body to the wicking material or from one wicking material to another. "Fluid contact" includes a positioning in which the wicking material is submerged in the body of fluid, but it is not so limited. "Fluid contact" also includes a positioning in which two wicking materials touch each other, but it is not limited to such a positioning.

In the embodiment shown, wicking material 50' is less dense and has a larger surface area than wicking material 50, thus providing for enhanced vaporization of animal scent 10; however, other densities may be used.

I claim:

1. A device for attraction of animals which utilizes animal scent, comprising:
    a container for holding animal scent;
    a heating element;
    a wick positioned within the container for making fluid contact with the animal scent, said wick drawing animal scent upwards from the container, said wick comprising a first wicking element physically contacting a second wicking element, said second wicking element being in physical proximity with said heating element, and said first wicking element being in fluid contact with the animal scent and with said second wicking element and wherein said second wicking element is less dense than said first wicking element; and
    a first housing in which said heating element is contained, said first housing covering the container and wick and said first housing comprising a vent which is positioned such that when the device is in use, animal scent vapor escapes through said vent; wherein said heating element is heated without monitoring the temperature of the scent and wherein there is not feedback control of the temperature of said heating element.

2. A device as in claim 1 wherein said heating element is a resistive element in electrical connection with a substantially direct current source.

3. A device as in claim 2 wherein said substantially direct current source comprises a plurality of batteries.

4. A device as in claim 3 wherein said plurality of batteries comprises four 1.5 volt batteries connected in series.

5. A device as in claim 1 wherein said heating element, when heating, has a temperature between about 95 and about 160 degrees Fahrenheit.

6. A device as in claim 1 wherein the container resides in a second housing, said second housing having a top which contains a hole in which the container is held;
    said first housing having a first connector and said second housing having a second connector, wherein said first connector and said second connector mate with each other is connect the first housing to the second housing.

7. A device as in claim 1 wherein said heating element is a resistive element in electrical connection with a substantially direct current source, and said substantially direct current source is mounted within a second housing.

* * * * *